United States Patent
Choi

(10) Patent No.: US 6,755,455 B2
(45) Date of Patent: Jun. 29, 2004

(54) RECEIPT CONSTITUTION OF CENTER FACIA PANEL

(75) Inventor: Jae-Seob Choi, Kyunggi-do (KR)

(73) Assignee: Hyundai Mobis, Co., Ltd., Kyunggi-do (KR)

(*) Notice: Subject to any disclaimer, the term of this patent is extended or adjusted under 35 U.S.C. 154(b) by 0 days.

(21) Appl. No.: 10/323,673

(22) Filed: Dec. 20, 2002

(65) Prior Publication Data

US 2004/0046407 A1 Mar. 11, 2004

(30) Foreign Application Priority Data

Sep. 5, 2002 (KR) .................... 10-2002-0053556

(51) Int. Cl.[7] ................................................ B60R 7/06
(52) U.S. Cl. ................... 296/37.12; 224/281; 224/483
(58) Field of Search .................... 296/37.12, 37.1, 296/37.8, 70; 180/90; 224/400, 483, 281

(56) References Cited

U.S. PATENT DOCUMENTS

| 5,052,728 A | * | 10/1991 | Fukumoto .................... 224/483 |
| 2002/0135194 A1 | * | 9/2002 | Schwarz .................... 296/37.8 |
| 2003/0001402 A1 | * | 1/2003 | Sawatani et al. .......... 296/37.1 |

FOREIGN PATENT DOCUMENTS

JP   40607226 A  *  3/1994  ................ 296/37.8

* cited by examiner

Primary Examiner—Lori L. Coletta
(74) Attorney, Agent, or Firm—Greenblum & Bernstein, P.L.C.

(57) ABSTRACT

The present invention relates to a storage system of a center facia panel and more particularly a storage system of a center facia panel for convenience of a user comprising an opening formed at one side in the front surface of the center facia, a housing to be inserted in the opening, guide rails formed at both sides of the housing, guiding members capable of sliding along the guide rails, and a storage part with the guiding members attached.

6 Claims, 5 Drawing Sheets

[FIG. 1]
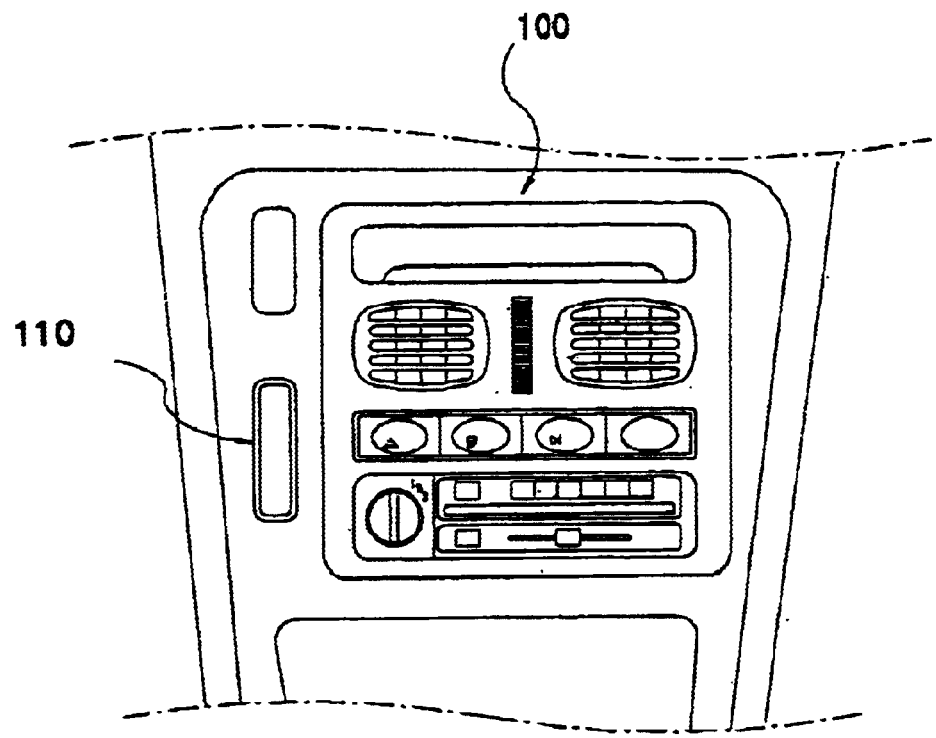
[FIG. 2]
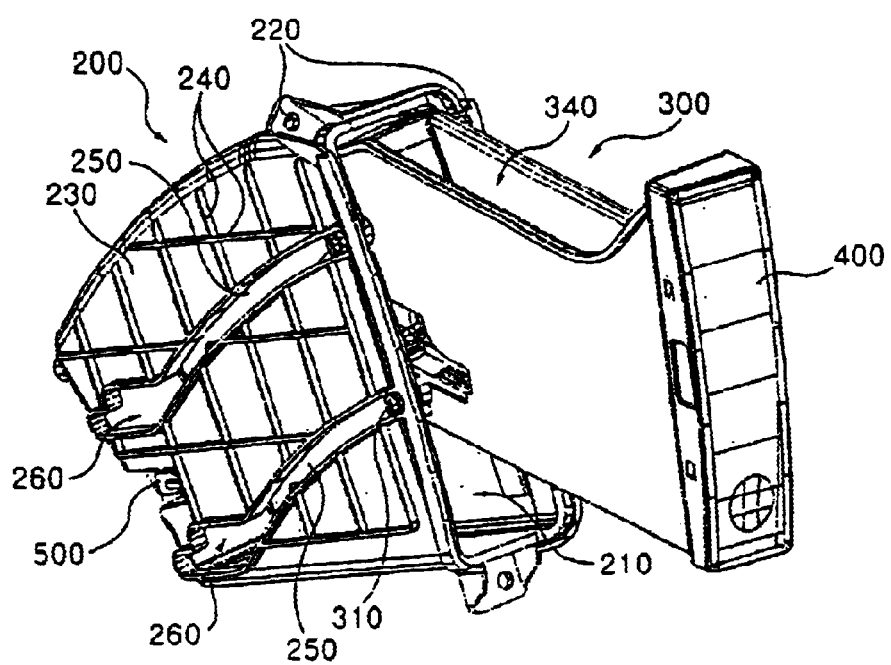

[FIG. 3]
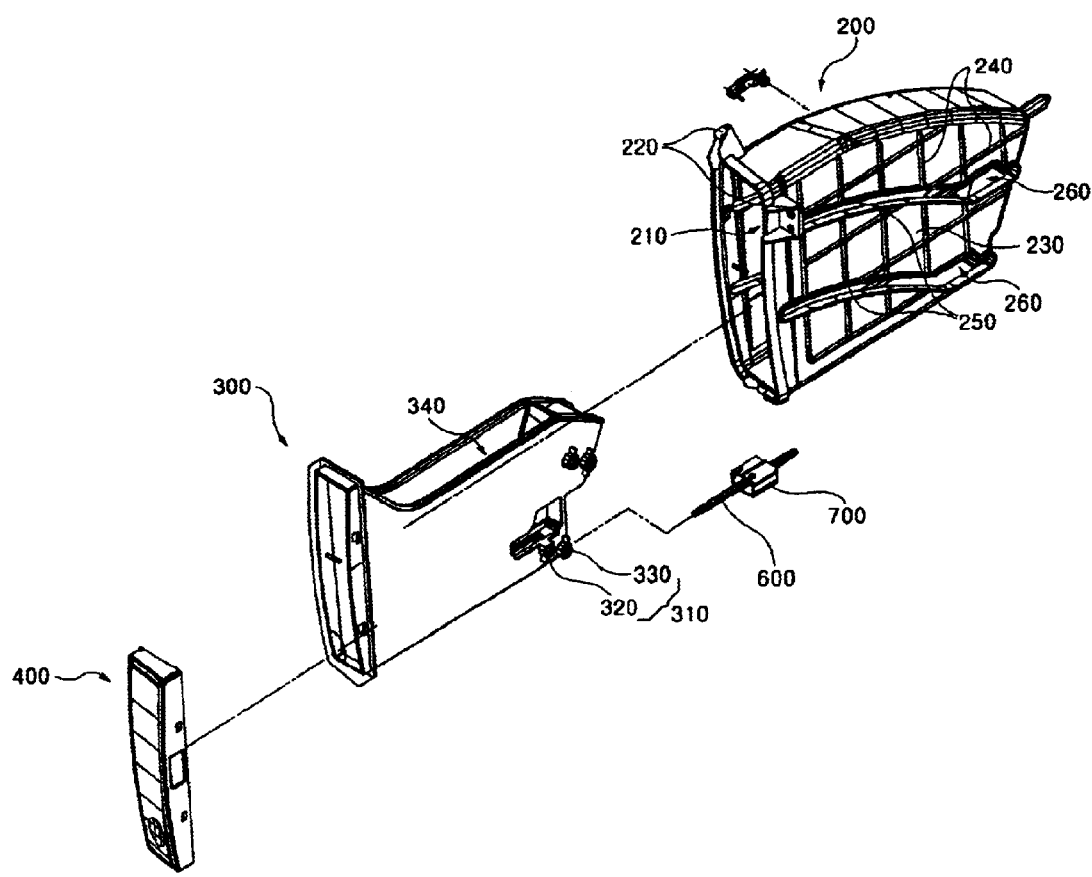

[FIG. 4]
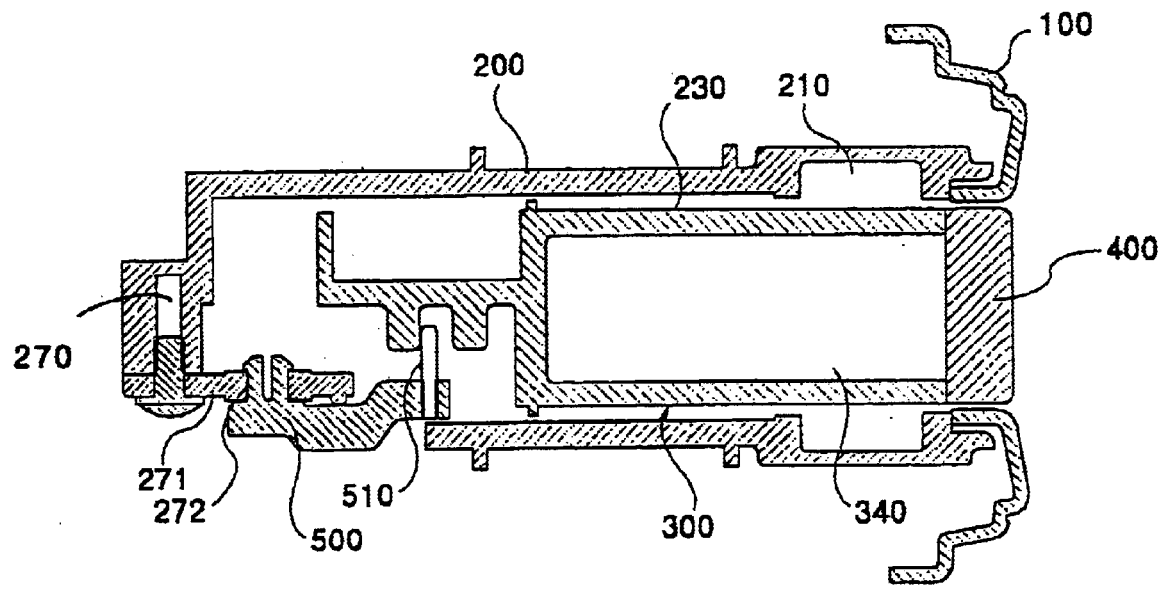
[FIG. 5]
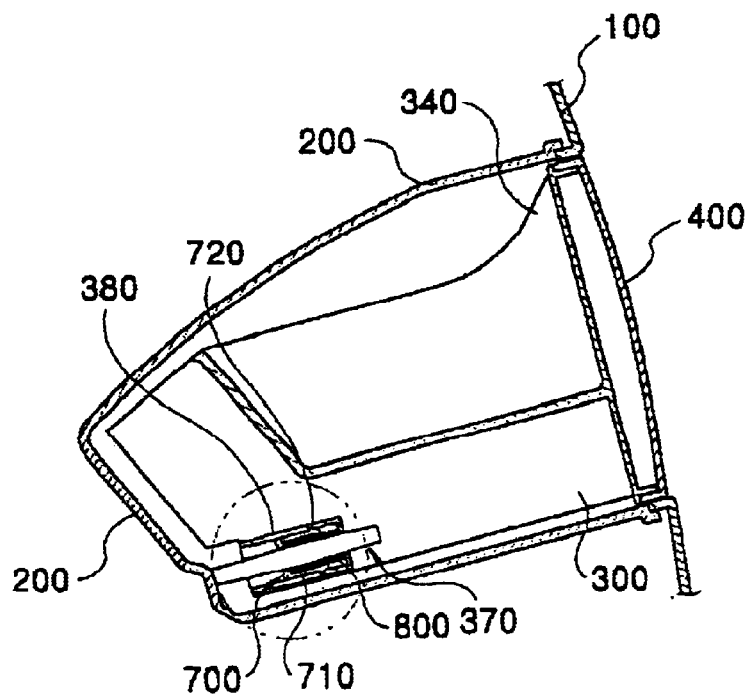

[FIG. 6]
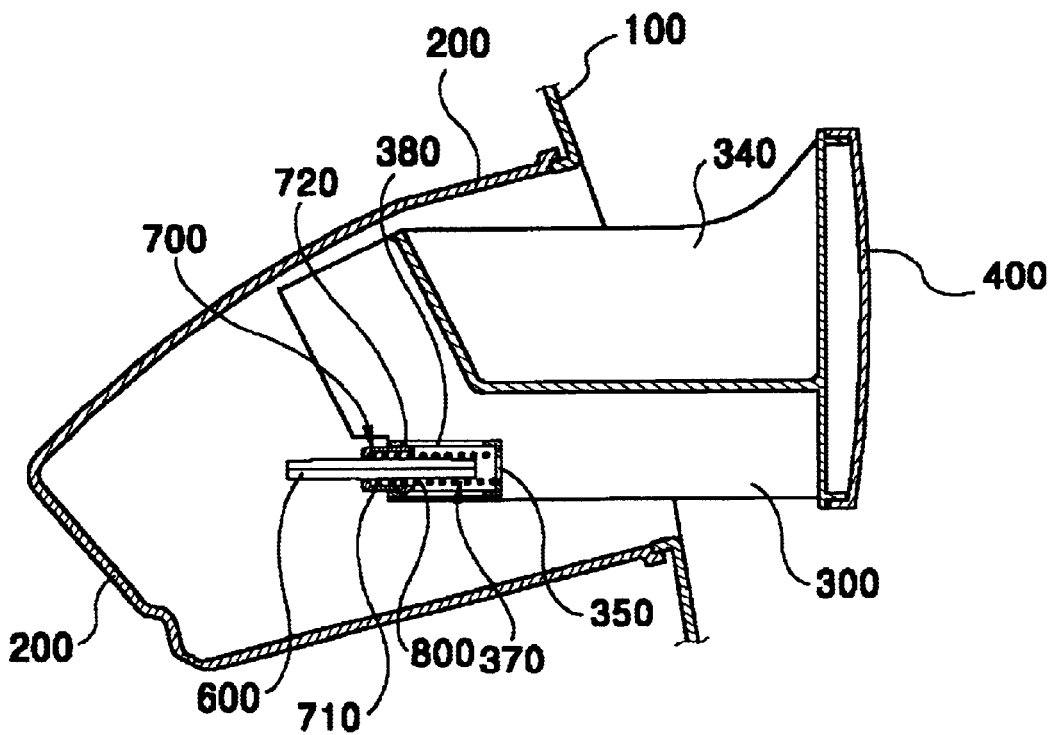
[FIG. 7]
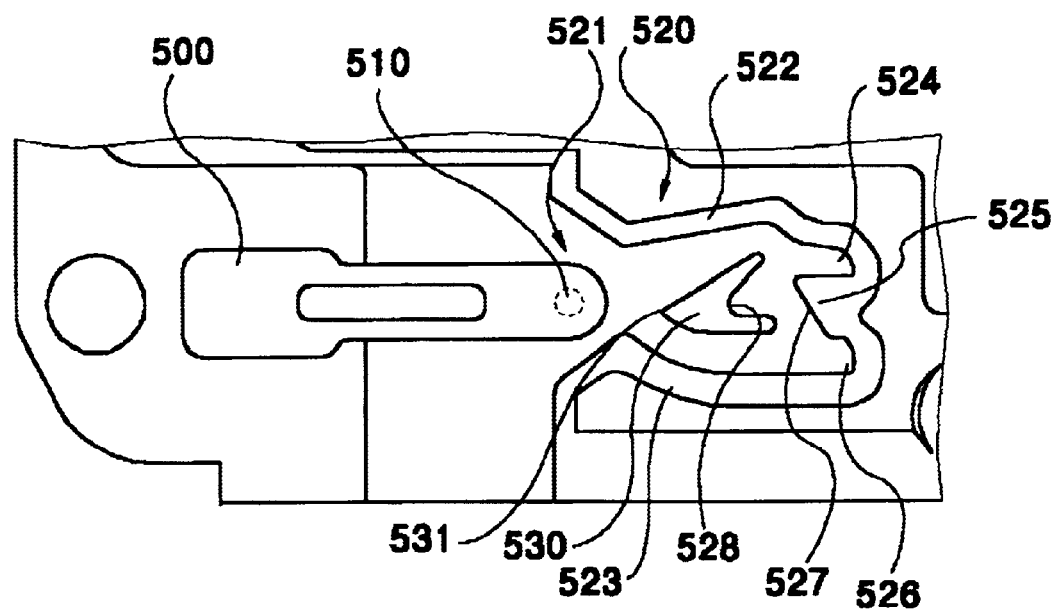

[FIG. 8]
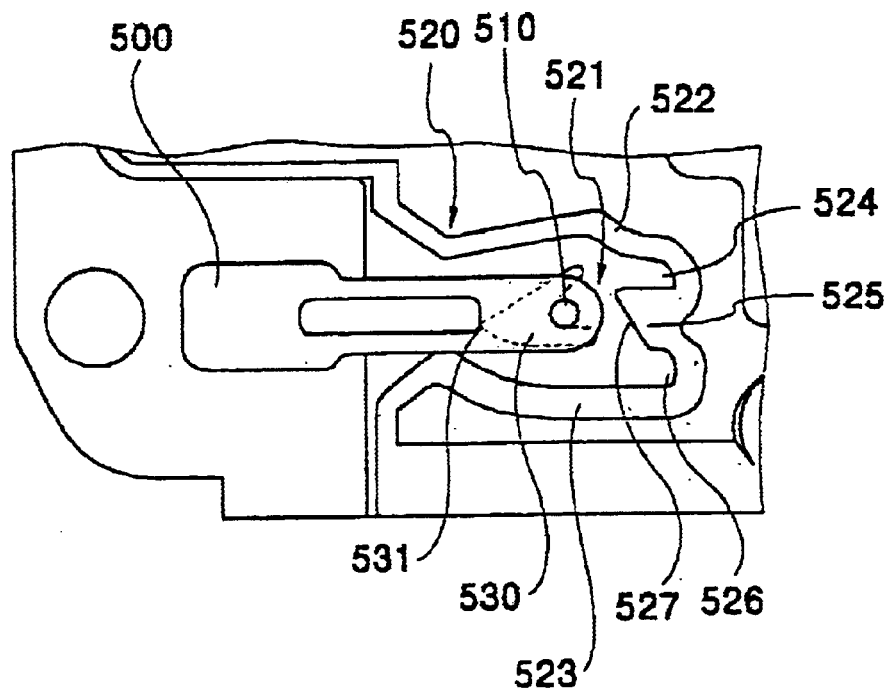
[FIG. 9]
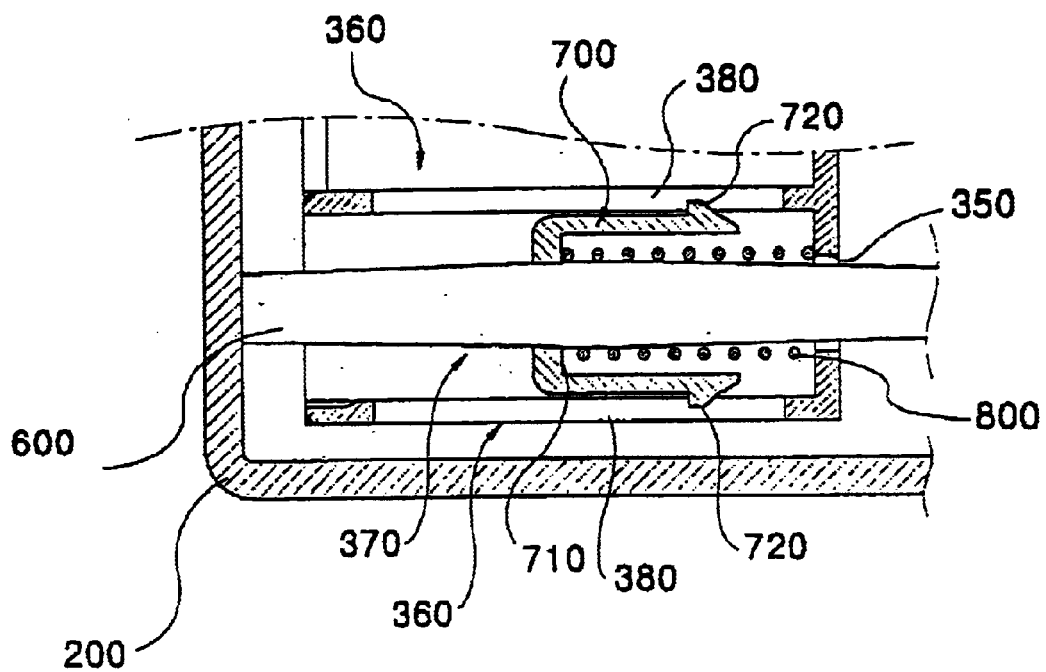

RECEIPT CONSTITUTION OF CENTER FACIA PANEL

BACKGROUND OF THE INVENTION

1. Field of the Invention

The present invention relates to a storage system of a center fascia panel which is located at both sides of the center fascia panel of the front seat in an automobile for storing articles of small size.

2. Description of the Related Art

In general, a center fascia which comprises devices for convenience of a driver such as an audio system, air conditioner, drink holder, ash tray and various switches installed thereon, as a part of an instrument panel, is disposed in the central space of the front seat in an automobile.

Conventionally, since various articles such as maps, dictionaries, cassette tapes, pens, scratch papers and the like have been kept in a glove box formed at the assistant's (i.e. passenger's) seat, it is not easy to take out any article needed while driving or stopping.

SUMMARY OF THE INVENTION

Therefore, the present invention has been made in view of the above problems, and it is an object the invention to provide an article storage structure of a center fascia panel comprising an opening formed at one side in the front surface of the center fascia, a housing with guide rails to be inserted in the opening, and a storage part inserted in the housing to be drawn out for convenience of a user.

In accordance with the present invention, the above and other objects can be accomplished by the provision of an article storage structure of a center fascia panel comprising an opening formed at one side in the front surface of the center fascia, a housing to be inserted in the opening, guide rails formed at both sides of the housing, guiding members capable of sliding along the guide rails and a storage part with the guiding members attached.

BRIEF DESCRIPTION OF THE DRAWINGS

The above and other objects, features and advantages of the present invention will be more clearly understood from the following detailed description taken in conjunction with the accompanying drawings, in which:

FIG. 1 is a front view of the center fascia panel according to the present invention;

FIG. 2 is a perspective view of the storage part according to the present invention;

FIG. 3 is an exploded perspective view of the housing and the storage part according to the present invention;

FIG. 4 is a sectional plane view of the housing and the storage part according to the present invention;

FIG. 5 is a sectional side view of the housing and the storage part according to the present invention when it is closed;

FIG. 6 is a sectional side view of the storage part according to the present invention when it is opened;

FIG. 7 is a partially enlarged sectional view of the rocking member and the second guiding part;

FIG. 8 is a partially enlarged sectional view showing the state in which the rocking member is inserted in the second guiding part; and FIG. 9 is a partially enlarged sectional view of FIG. 5.

DETAILED DESCRIPTION OF THE PREFERRED EMBODIMENT

Now, the article storage structure of a center fascia panel according to the present invention will be described with reference to the accompanying drawings.

As shown in figures, a center fascia panel 100 is provided at one side in the front surface thereof with an opening 110.

The opening 110 may be formed at the center of the front surface of the center fascia panel 100, or a plurality of openings may be formed at the upper and lower and right and left sides of the center fascia panel.

A housing 200 is inserted in the opening 110. The housing 200 has a receiving part 210 with a space therein and is provided with a plurality of binding holes 220 at edges of its front surface.

Also, as shown in figures, the side walls 230 of the housing 220 is formed with a plurality of ribs 240 extending horizontally and vertically while crossing each other.

Guide rails 250 are formed on the side walls of the housing 200 while penetrating the ribs across the side walls 230. Here, a plurality of guide rails may be formed on each side wall.

The guide rails 250 are connected to protrusion receiving parts 260 which is located at the rear end of the housing, parallel to the lower end of the housing 200. Thus, the guide rails 250 define arcs which extend from the protrusion receiving parts 260 and reach a higher height as closer to the front part of the housing 200.

A storage part 300 is inserted in the receiving part 210 formed in the housing 200. The storage part 300 is provided with guiding members 310 at both sides. The guiding members 310 are designed to be inserted in and travel along the guide rails 250 and thus have a shape corresponding to the guide rails 250.

The guiding members 310 are formed on the side walls of the storage part 300 and include a first guiding member 320 and a second guiding member 330.

The first guiding member 320 and the second guiding member 330 are disposed at different heights.

The storage part 300 has a space for article storage 340 therein.

Also, the storage part 300 is provided with a binding part to be fastened with a pushing part 400.

A groove 270 is formed at an edge of the rear surface of the housing 200. The groove 270 is provided with a rocking binding part 271 at one side thereof. The rocking binding part 271 has a through hole 272 at one side thereof.

A rocking member 500 is inserted in the through hole 272 in the rocking binding part 271 and installed in a way that it can move upward and downward. The rocking member 500 binds with a protrusion 510 at the inside of the end.

The storage part 300 is provided with a second guiding part 520 at one side of the rear end where the protrusion 510 is inserted. The second guiding part 520 defines an insert part 521 in which the protrusion 510 of the rocking member can be inserted. The insert part 521 starts from the rear of the storage part 300 and defines a curve that has a less slope, as it is closer to the front.

The insert part 521 extends to form a upper guiding part 522 at the upper part and a lower guiding part 523 at the lower part. The upper guiding part 522 is connected to a second separation-inhibiting part 526, which is in turn connected to the lower guiding part 523. Here, a knoll for separation inhibition 525 is formed to have an incline plane 527 from the first separation-inhibition part 524 to the second separation-inhibition part 526.

The incline plane 527 forms an angle greater than 90° with respect to the second separation inhibiting part 526.

Between the upper guiding part 522 and the lower guiding part 523, a guiding protrusion 530 with a receiving groove 528 is provided. Here, the receiving groove 528 is formed in a way that its center is located at a height lower than that of the upper edge 529 of the knoll for separation inhibition 525. Also, the guiding protrusion 530 has an insert edge 531, where the protrusion 510 is inserted, at a height lower than that of the receiving groove 528.

The guiding protrusion is disposed at the center of the upper guiding part 522, lower guiding part 523 and knoll for separation inhibition 521 and an angle of inclination from the insert edge 531 is lower than that of the lower end of the insert 521.

The rear wall of the storage part 300 has a guiding hole 350 at one side thereof, in which a guiding bar 600 is inserted.

Also, a separation wall 360 is formed at the lower end of the second guiding part 520 and a guiding bar receiving part 370 is formed at the lower end of the storage part 300. The guiding bar 600 inserted in the guiding bar receiving part 370 is provided with a transferring member 700 at its center.

The transferring member 700 has a ⊏shaped cross section. An elastic member 800 is disposed between the transferring member 700 and the guiding bar 600.

One end of the elastic member 800 is supported by the inner surface 710 of the transferring member 700 and the other end is supported by the wall on which the guiding hole 350 is formed.

The transferring member 700 is also provided with an engaging part 720 at the outer surface thereof. The separation wall 360 of the guiding bar receiving part 370 is partially cut or is provided with a long hole 380 to correspond to the engaging part 720.

When the guiding bar 600 is transferred, the engaging part 720 of the transferring member 700 is guided by the long hole 380 formed on the separation wall 360 due to the elastic member 800.

The operation and embodiments of the article storage structure of the ceter facia panel according to the present invention as described above will be explained with reference to the accompanying drawings.

FIG. 5 is a sectional side view of the housing and the storage part according to the present invention, FIG. 6 is a sectional side view of the storage part according to the present invention which is drawn out, FIG. 7 is a partially enlarged sectional view of the rocking member and the second guiding part, and FIG. 8 is a partially enlarged sectional view showing the state in which the rocking member is inserted in the second guiding part.

The housing 200 is inserted in the opening 110 which is formed at one side of the front surface of the center facia 100, in which a plurality of binding holes 220 is fastened with one end of the opening 110 of the center facia panel 100.

The rocking member 500 is fastened in the groove 270 formed at one side of the rear end of the housing 200.

One end of the rocking member 500 is inserted rotatably in the through hole 272 of the rocking binding part 271 formed at one side of the groove 270.

On the front of the storage part 300, the pushing part 400 is provided and the guide bar 600 is disposed at the guiding bar receiving part 370 formed at one side of the rear end of the storage part 300.

The guiding bar receiving part 370 is inserted in the guiding hole 350 formed at the wall and the guiding bar 600 is provided with the transferring member 700 at its center.

The elastic member 800 is disposed between the inner side of the transferring member 700 and the outer side of the guiding bar 600.

The elastic member 800 is supported by the wall of the guiding hole 350 formed at the storage part 300 and the inner surface of the guiding bar receiving part 370.

The storage part 300 is inserted in the receiving part 210 formed inside the housing 200 in which the guiding members 310 formed at both sides the storage part 300 are inserted in the guide rails 250 formed on the both surface of the housing 200.

The article storage structure of center facia according to the present invention as described above operates as follows.

As shown in FIG. 5, a sectional side view of the housing and the storage part, when an article is intended to be stored, the pushing part 400 formed on the front surface of the storage part 300 is pushed.

Then, the protrusion part 510 formed on the rocking member slides downward along the inclined plane 527 formed on the knoll for separation inhibition 525 to the second separation inhibiting part 526.

Simultaneously, the transferring member 700 engaged with the the guiding bar 600 is transferred by the elasticity of the elastic member 800 formed at the inner surface thereof and the engaging part 720 formed at the outer surface of the transferring member 700 is guided in the long hole 380 to the end of the hole 380.

The protrusion part 510 formed on the rocking member 500 is guided between the upper surface of the lower guiding part 523 and the lower surface of the guiding protrusion part 530, whereby the storage part 300 moves forward.

When the storage part comes out, the guiding member 310 is transferred in the protrusion receiving part 260 formed the side wall of the housing 200. As the guiding member 310 slides forward along the guide rails 250, the storage part 300 comes out.

In the contrary, when the storage part 300 is intended to be put in the receiving part 210 formed in the housing 200, by pushing the pushing part 400, the rear end of the guiding bar 600 reaches the inner wall of the receiving part 210. Thus, the front of the guiding bar 600 is inserted and transferred, whereby the transferring member 700 engaged with the guiding bar 600 is guided in the long hole 380.

At the same time, the protrusion 531 formed on the rocketing member 500 is inserted in the insert part 521 of the second guiding part 520. Since the lower end of the insert part 521 is inclined upward, the protrusion part 510 is easily guided.

Also, as the insert edge 531 formed on the guiding protrusion 530 is located in the rear of the inclined plane formed at the end of the insert part 521, the insert edge forms an inclined plane starting from the guiding protrusion 530, the protrusion part 510 is transferred between the upper surface of the guiding protrusion 530 and the lower surface of the upper guiding part 522.

The protrusion part 510 is transferred to the first separation inhibiting part 524 and reaches the receiving groove 528 formed on the guiding protrusion 530 when the user releases the pushing part 400.

As described above, the article storage structure of the center facia according to the present invention can be used conveniently by a simple manipulation and can store various articles for convenience of a user.

The above described article storage structure of the center facia according to the present invention has effects as follows.

It is possible to conveniently take out various articles such as scratch papers, dictionaries, mobile phone, maps, cassette tapes, which are stored in the storage system formed on the center facia panel, while driving or stopping.

Therefore, the articles which have been conventionally stored in the glove box formed at the assistant's seat can be safely used while driving or stopping.

Since the storage part is drawn out by the guide rails formed on the housing, it can be conveniently used.

The storage part can be smoothly drawn out by the guiding members which are inserted and slide in the guide rails.

The guide rails and the protrusion receiving parts are formed in a arc shape so that the storage part has different angles upon drawing out or insertion and maintains the horizontal state.

The storage part can be conveniently drawn out by only one pushing of the pushing part because of the actions of the rocking member and the second guiding part and the guiding bar and the transferring member.

What is claimed is:

1. An article storage structure of a center fascia panel comprising:
   an opening formed at one side in the front surface of the center fascia panel;
   a housing configured to be inserted in the opening;
   guide rails formed at both sides of the housing;
   guiding members capable of sliding along the guide rails; and
   a storage part, the guiding members attached to the storage part,
   wherein the guide rail comprises a protrusion receiving part located at the rear end of the housing, parallel to the lower end of the housing and defines an arc which extends from the protrusion receiving part and reaches a higher height as closer to the front part of the housing and the guiding member has a first guiding member and a second guiding member formed on the side wall of the storage part, in which the first guiding member and the second guiding member are located at different heights.

2. An article storage structure of a center fascia panel comprising:
   an opening formed at one side in the front surface of the center fascia panel;
   a housing configured to be inserted in the opening;
   guide rails formed at both sides of the housing;
   guiding members capable of sliding along the guide rails;
   a storage part, the guiding members attached to the storage part;
   a rocking member rotatably installed on the housing; and
   a second guiding member formed on the storage part, which can be released from or engaged with the rocking member
   wherein the guide rail comprises a protrusion receiving part located at the rear end of the housing, parallel to the lower end of the housing and defines an arc which extends from the protrusion receiving part and reaches a higher height as closer to the front part of the housing and the guiding member has a first guiding member and a second guiding member formed on the side wall of the storage part, in which the first guiding member and the second guiding member are located at different heights.

3. An article storage structure of a center fascia panel comprising:
   an opening formed at one side in the front surface of the center fascia panel:
   a housing configured to be inserted in the opening;
   guide rails formed at both sides of the housing;
   guiding members capable of sliding along the guide rails;
   a storage part, the guiding members attached to the storage part;
   a rocking member rotatably installed on the housing;
   a second guiding member formed on the storage part, which can be released from or engaged with the rocking member;
   a guiding bar disposed at the rear end of the inside of the storage part;
   a transferring member binding to the outer surface of the guiding bar and moving forward and backward; and
   a protrusion part having an engaging part formed on the outer surface of the transferring member,
   in which an elastic member is provided between the guiding bar and the transferring member.

4. The article storage structure according to claim 3, wherein the second guiding member comprises:
   an insert part in which the protrusion part is inserted;
   upper and lower guiding parts formed to be connected to the insert part, in which a guiding protrusion part having a receiving groove is formed between the upper guiding part and the lower guiding part;
   a first separation inhibiting part formed to be connected to the upper guiding part; and
   a second separation inhibiting part formed to be connected to the lower guiding part, in which a knoll for separation inhibition is formed between the first separation inhibiting part and the second separation inhibiting part.

5. The article storage structure according to claim 3, wherein the guide rail comprises a protrusion receiving part located at the rear end of the housing, parallel to the lower end of the housing and defines an arc which extends from the protrusion receiving part and reaches a higher height as closer to the front part of the housing and the guiding member and a second guiding member formed on the side wall of the storage part, in the first guiding member and the second guiding member are located at different heights.

6. The article storage structure according to claim 4, wherein the guide rail comprises a protrusion receiving part located at the rear end of the housing, parallel to the lower end of the housing and defines an arc which extends from the protrusion receiving part and reaches a higher height as closer to the front part of the housing and the guiding member has a first guiding member and a second guiding member formed on the side wall of the storage part, in which the first guiding member and the second guiding member are located at different heights.

* * * * *

UNITED STATES PATENT AND TRADEMARK OFFICE
CERTIFICATE OF CORRECTION

PATENT NO. : 6,755,455 B2
DATED : June 29, 2004
INVENTOR(S) : J. Choi

It is certified that error appears in the above-identified patent and that said Letters Patent is hereby corrected as shown below:

Title page,
Item [54], Title, "FACIA" should be -- FASCIA --.
Item [57], ABSTRACT,
Line 1, "The present invention relates to a" should be -- A --.
Lines 2, 3 and 5, "facia" should be -- fascia --.

Signed and Sealed this

Nineteenth Day of April, 2005

JON W. DUDAS
*Director of the United States Patent and Trademark Office*